United States Patent [19]
Park

[11] Patent Number: 5,792,019
[45] Date of Patent: Aug. 11, 1998

[54] CONTINUOUSLY VARIABLE TRANSMISSION WITH TORQUE CONVERTER FOR A VEHICLE AND HYDRAULIC CONTROL SYSTEM FOR CONTROLLING THE SAME

[75] Inventor: Jae-Sung Park, Seoul, Rep. of Korea

[73] Assignee: Kia Motors Corporation, Seoul, Rep. of Korea

[21] Appl. No.: 688,890

[22] Filed: Jul. 31, 1996

[30] Foreign Application Priority Data

Jul. 2, 1996 [KR] Rep. of Korea ............... 1996 26712

[51] Int. Cl.$^6$ ............................................. F16H 55/52
[52] U.S. Cl. ............................................. 475/206
[58] Field of Search ............................ 475/200, 206, 475/210; 474/28

[56] References Cited

U.S. PATENT DOCUMENTS

| | | | |
|---|---|---|---|
| 4,125,037 | 11/1978 | Palmer et al. | 475/200 |
| 4,294,137 | 10/1981 | Piret et al. | 475/206 |
| 4,304,150 | 12/1981 | Lupo et al. | 475/206 |
| 4,433,594 | 2/1984 | Smirl | 475/206 |
| 4,484,493 | 11/1984 | Yamamuro et al. | 475/206 |
| 4,736,652 | 4/1988 | Shimamoto | 475/206 |
| 4,873,879 | 10/1989 | Butterfield et al. | 475/206 |
| 4,907,471 | 3/1990 | Ishimaru | 475/206 |

FOREIGN PATENT DOCUMENTS

| | | |
|---|---|---|
| P6-47350 | 7/1994 | Japan. |
| P7-6575 | 1/1995 | Japan. |
| P7-8631 | 2/1995 | Japan. |

*Primary Examiner*—Dirk Wright

[57] ABSTRACT

A continuously variable automatic transmission, including: a torque converter having a lockup damper, said torque converter being connected to an engine and operating a hydraulic pump; a first axle on which a fist pulley is mounted, said first axle being connected to an output shaft of said torque converter; a second axle on which a second pulley which is connected to the first pulley through a belt is mounted, said second axle is disposed parallel to the second axle; a third axle on which an output gear is meshed with a ring gear of a differential system, said third axle is disposed parallel to said second axle; a pair of pistons which are respectively mounted on rear ends of said first and second pulleys, said pistons being operated by hydraulic pressure; forward and reverse wet multi-plate clutches which are respectively connected to the pistons to transmit power; a pair of forward gears which are respectively mounted on said second and third axles and mesh with each other, said forward gears receiving power from the forward wet multi-plate clutch; and a pair of reverse gears which are respectively mounted on said second and third axles and mesh with each other, said reverse gears receiving power from the reverse wet multi-plate clutch.

6 Claims, 8 Drawing Sheets

CONTINUOUSLY VARIABLE TRANSMISSION WITH TORQUE CONVERTER FOR A VEHICLE AND HYDRAULIC CONTROL SYSTEM FOR CONTROLLING THE SAME

FIELD OF THE INVENTION

The present invention relates to a continuously variable transmission with a torque converter for a vehicle and a hydraulic control system for controlling the same and, more particularly, to a continuously variable transmission which can alleviate shift shock during the shift operation and improve a fuel consumption ratio by maintaining both the engine RPMs and the torque at levels suitable for the vehicle's running, and to a hydraulic control system for controlling hydraulic pressure for operating each friction member of the transmission.

PRIOR ART

An automatic transmission for a vehicle provides a necessary gear ratio to operate the vehicle under a wide range of speeds and loads. It thus operates with a minimum amount of effort on the part of the driver. Specifically, an automatic transmission automatically shifts between ranges and is thereby a convenience for the driver because a foot-operated clutch is not required to shift gears. In addition, the vehicle can be brought to a stop without the use of a clutch and without shifting the transmission into neutral.

However, the convention automatic transmission has a shortcoming in that shift shock occurs due to a gear ratio difference between gears achieving the shift operation.

In addition, friction members for achieving the shift operation, for example brakes and clutches, need to be mounted for each speed ratio, and thus a hydraulic control system for controlling the friction members are inherently complicated, resulting in increased manufacturing costs.

Due to a predetermination of speed ratios, the engine RpMs is increased for a low speed ratio, resulting in the deterioration of the fuel consumption ratio.

In recent years, a continuously variable transmission has been developed to solve the above described shortcomings such as a conventional continuously variable transmission to indefinitely vary the speed ratio.

In the continuously variable transmission, since the engine running state has no relation to vehicle speed within a controllable shift range of the transmission, the engine can operate in theory within an optimal RPM range.

In addition, the continuously variable transmission can be controlled to a maximum output state and an optimal fuel consumption ratio for a whole engine running range within a short period of time. The power transmission is also not disconnected during the shift operation.

One of the continuously variable transmissions proposed is a belt-type continuously variable transmission comprising a planetary gear unit and a hydraulic control system.

Figure 1:
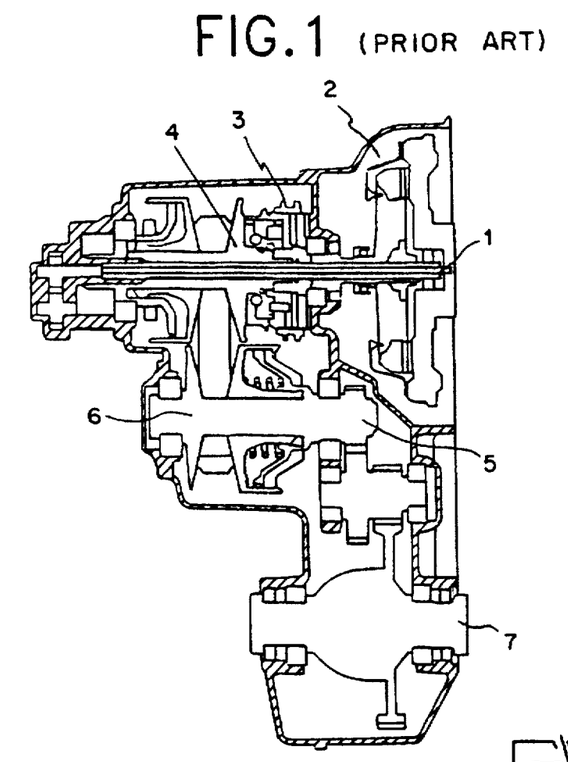
FIG. 1 is a sectional view illustrating a conventional belt-type continuously variable automatic transmission.

FIG. 1 shows the belt-type continuously variable transmission. The belt-type continuously variable transmission comprises: an input shaft 1, on which a planetary gear unit 3 having a multi-plate clutch 2 for forwarding and reversing and a driving pulley 4 are mounted; and an output shaft 5, on which a driven pulley 6 having a variable effective diameter, a final reduction system and a differential system are mounted.

The belt-type continuously variable automatic transmission is controlled by hydraulic pressure in a starting range such that an effective diameter of the driving pulley 4 is minimized and a diameter of the driven pulley 6 is maximized, thereby starting the vehicle at a low speed. In a high speed range, the diameter of the driving pulley 4 is maximized and the diameter of the driven pulley 6 is minimized, thereby obtaining the high speeds.

However, the belt-type continuously variable automatic transmission has a shortcoming in that transmission efficiency is deteriorated by a belt slip.

To solve for the shortcomings of the conventional belt-type continuously variable automatic transmission, many types of continuously variable automatic transmissions have been proposed.

Figure 2:
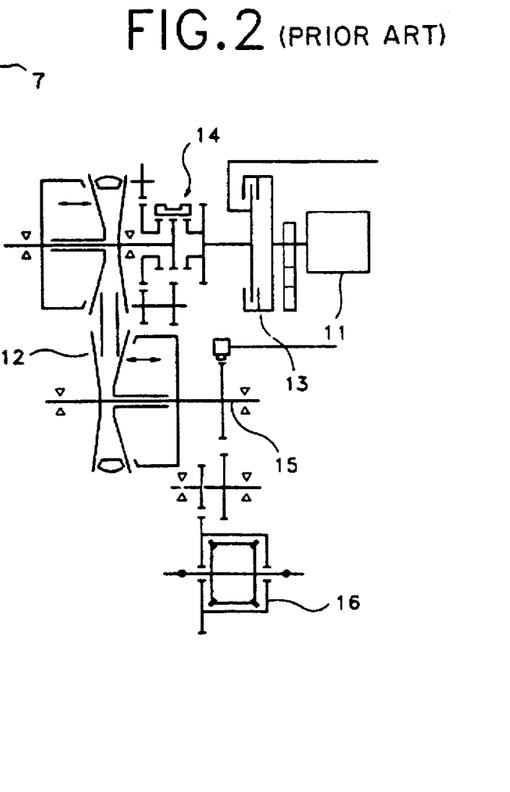
FIGS. 2, 3 and 4 are schematic diagrams illustrating various conventional belt-type continuously variable automatic transmissions.

For example, Japanese patent publication No. p6-47350 discloses a continuously variable automatic transmission system as depicted in FIG. 2. The system comprises a slip-type clutch 13 mounted between an engine 11 and a continuously variable automatic transmission 12 having a drive pulley and a driven pulley, and a forward/reveres synchromesh mechanism 14 mounted between the slip-type clutch 13 and the continuously variable automatic transmission mechanism, and a differential gear 16 carried on an output shaft of the continuously variable automatic transmission.

Figures 3, 4:
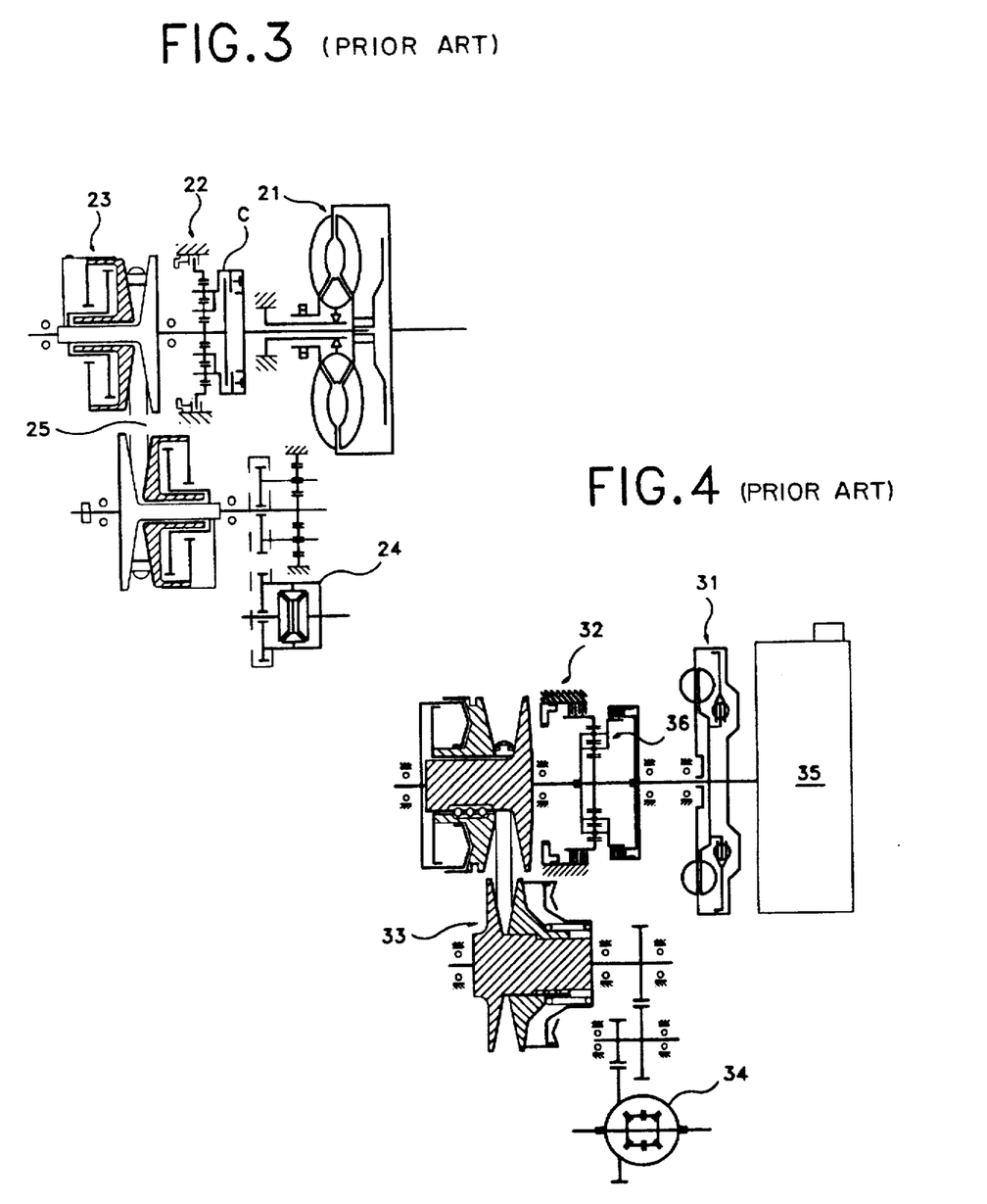

In another example, Japanese patent publication No. P7-6575 discloses a continuously variable automatic transmission system depicted in FIG. 3. The transmission comprises a torque converter 21 having a direct clutch, a planetary gear unit 22 for changing the vehicle into forward and reverse operation modes, a V-belt type continuously variable automatic transmission mechanism 23, and a differential system 24.

The planetary gear unit 22 uses an output shaft of the torque converter 21 and an input shaft of the V-belt type continuously variable automatic transmission as its input and output shafts, respectively.

In addition, a metal block having wheel-shaped steel bands is mounted between the driving and driven pulleys. The V-belt is seated on the metal block which can reduce the slip of the belt.

In yet another example, Japanese patent publication No. 7-8631 discloses a continuously variable automatic transmission depicted in FIG. 4. The transmission comprises a fuel cutting apparatus 31, a directional control mechanism 32, a V-belt type transmission mechanism 33, and a differential system 34. A planetary gear unit 36 is mounted between the fuel cutting 31 and the transmission mechanism 33.

However, in the above described continuously variable automatic transmission systems, since a multi-plated clutch for interrupting the power of the engine is mounted between the input shaft of the engine and the drive pulley, power cannot be transmitted from the drive pulley to the driven pulley when the shift selector lever is shifted from the drive "D" range to the neutral "N" range.

That is, in the neutral "N" range, since the belt cannot function with the engine, the diameter of the belt cannot be adjusted. In addition, when the shift selector lever is shifted from the neutral "N" range to the drive "D" range, since the belt is abruptly rotated, shock caused by over load occurs, thereby failing to attain immediate driving force.

SUMMARY OF THE INVENTION

Therefore, it is an object of the present invention to provide a continuously variable automatic transmission with a torque converter, which can improve ride comfort by alleviating shift shock, reduce the manufacturing costs by simplifying the structure, and improve the fuel consumption ratio.

It is another object of the present invention to provide a hydraulic control system which can control the continuously variable automatic transmission with a torque converter, and simplify the structure thereof by reducing the number of valves.

To achieve the above objects, the present invention provides a continuously variable automatic transmission, comprising:

- a torque converter having a lockup damper, said torque converter being connected to an engine and operating a hydraulic pump;
- a first axle on which a fist pulley is mounted, said first axle being connected to an output shaft of said torque converter;
- a second axle on which a second pulley which is connected to the first pulley through a belt is mounted, said second axle is disposed parallel to the second axle;
- a third axle on which an output gear is meshed with a ring gear of a differential system, said third axle is disposed parallel to said second axle;
- a pair of pistons which are respectively mounted on rear ends of said first and second pulleys, said pistons being operated by hydraulic pressure;
- forward and reverse wet multi-plate clutches which are respectively connected to the pistons to transmit power;
- a pair of forward gears which are respectively mounted on said second and third axles and mesh with each other, said forward gears receiving power from the forward wet multi-plate clutch; and
- a pair of reverse gears which are respectively mounted on said second and third axles and mesh with each other, said reverse gears receiving power from the reverse wet multi-plate clutch.

According to another aspect of the present invention, a hydraulic control system for controlling the continuously variable automatic transmission with a torque converter, said hydraulic control system comprising:

- a ratio control valve mounted on a first fluid line connecting a hydraulic pump to each piston of first and second pulleys so as to selectively feed hydraulic pressure to the pistons;
- a first duty solenoid valve for controlling an opening of the ratio control valve in accordance with a duty value calculated by a transmission control unit in response to a speed of a vehicle;
- a line pressure control valve for regulating hydraulic pressure within a second fluid line branched off from the first fluid line;
- a clutch control valve, which is connected to the line pressure control valve, for controlling hydraulic pressure fed to forward and reverse wet multi-plate clutches;
- a second duty solenoid valve for controlling an opening of the clutch control valve in accordance with a duty value calculated by the transmission control unit;
- a converter control valve, which is connected to the clutch control valve, for controlling hydraulic pressure fed to the torque converter; and
- a manual valve, which is mounted on a third fluid line branched off from the second fluid line and is connected to a shift selector lever, for selectively feeding hydraulic pressure to the forward and reverse wet multi-plate clutches.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 5:
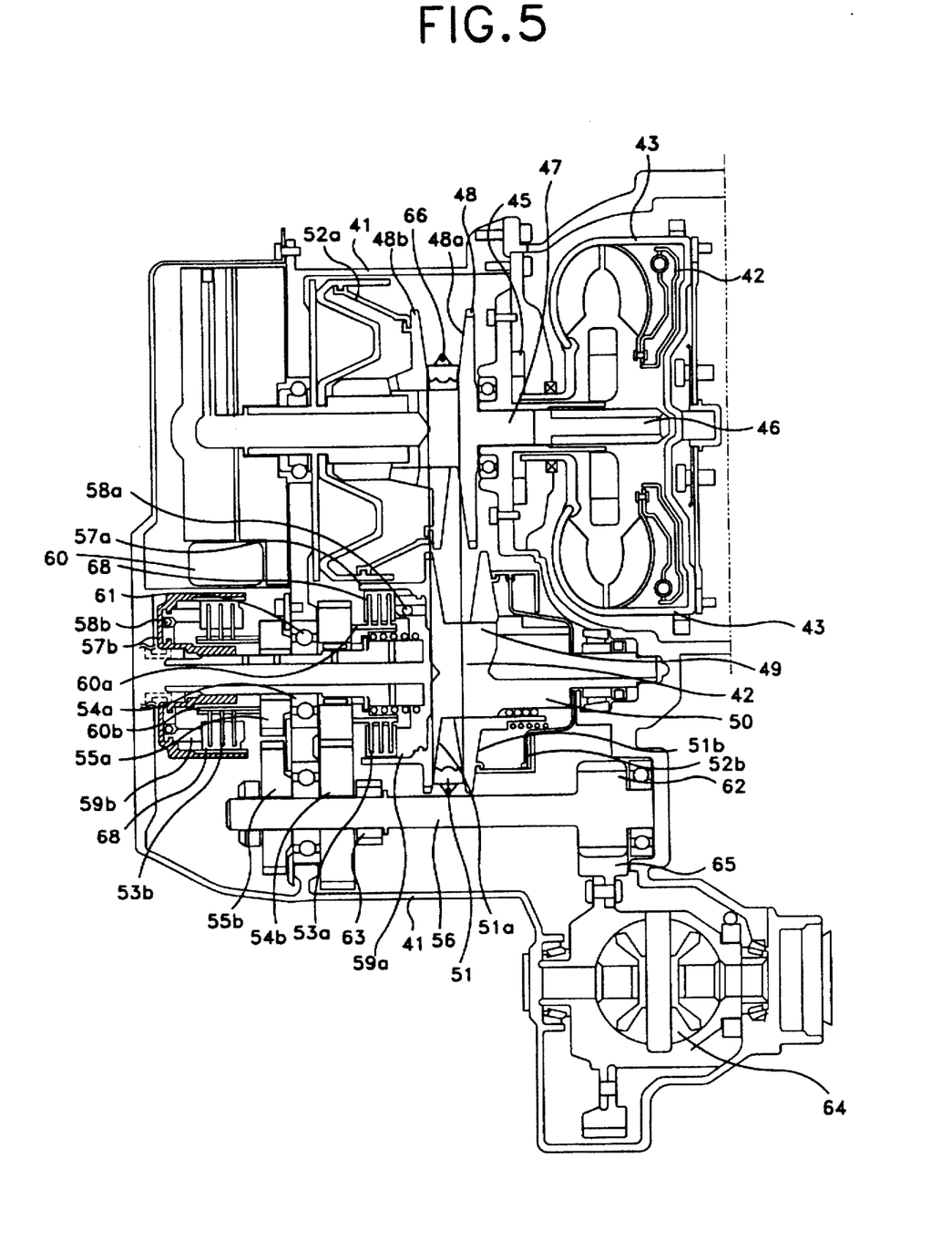
FIG. 5 is a sectional view illustrating a continuously variable automatic transmission with a torque converter according to a preferred embodiment of the present invention.

Referring first to FIG. 5, a torque converter 43 having a lockup damper 41 is located within a transmission case 40 and is connected to an engine (not shown) to operate a hydraulic pump 45. An output shaft 6 of the torque converter 43 is directly connected to a first axle 47 in a spline manner, a V-belt 49 of a first pulley 48 mounted on the first axle 47 and is connected to a second pulley 51 mounted on a second axle 50 is disposed parallel to the first axle 47. A pair of pistons 52a and 52b are respectively disposed on and in contact with rear faces of the first and second pulleys 48 and 51. The second axle 50 is connected and disconnected with a third axle 56 in accordance with selective engagement of forward/reverse gears 54a, 54b, 55a, and 55b by the operation of wet multi-plate clutches 53a and 53b, thereby accomplishing the shift operation in forward, reverse and neutral modes.

In addition, a drum 57 is integrally fixed on a rear side of a fixing sheaf 51a of the second pulley 51. A forwarding wet multi-plate clutch 53a, which forwards in response to the operation of a clutch piston 59a on which a drift-on-ball is mounted, is also mounted on the rear side of the fixing sheaf 51a. A forward gear 54a and a clutch hub 60a are integrally formed with the forward wet multi-plate clutch 53a, and a ball bearing 61, a reverse gear 55a, reverse wet multi-plate clutch 53b and a drum 57b are mounted in order.

The hub, on which the reverse wet multi-plate clutch 53b and the reverse gear 55a are integrally formed with each other, is disposed on the opposite side of the forward gear 54a on the basis of the ball bearing 61. The reverse wet multi-plate clutch 53b is designed to operate by hydraulic pressure of a clutch piston 59b on which a drift-on-ball 58b is mounted.

In addition, forward and reverse gears 54b and 55b, which are selectively engaged with the forward and reverse gears 54a and 55a on the second axle 50, respectively, are mounted on the third axle 56. A parking gear 63 is mounted between the forward gear 54b and an output gear 62. Therefore, the third axle 56 is connected to a differential system by the engagement of the output gear 62 and a ring gear 65 of the differential gear 64.

The V-belt, which connects the first pulley 48 of the first axle 47 to the second pulley 51 of the second axle 50, is a steel belt, which is a well known push type V-belt. The first and second pulleys 48 and 51 are respectively composed of moving sheaves 48b and 51b and fixing sheaves 48a and 51a. Each of the sheaves 48a, 48b, 51a and 51b is provided with a slant face on which the V-belt 49 is seated.

The V-belt 49 is lubricated and cooled by oil fed from a nozzle 66 so as to prevent it from wearing down.

The moving sheaves 48b and 51b are disposed opposing each other in a diagonal direction on the first and second axles 47 and 50, respectively, in order to prevent the V-belt 49 from being twisted during the shift operation.

The forward and reverse wet multi-plate clutches 53a and 53b serve to transmit power which is used for operating the forward and reverse gears 54a and 55a. To alleviate shock when the clutches 53a and 53b are operated, a hydraulic accumulator is used and the number of clutch sheets of the wet multi-plate clutches 53a and 53b can be variously selected in accordance with drive torque of the engine.

As described above, the forward and reverse wet multi-plate clutches 53a and 53b are operated by the clutch pistons 59a and 59b, on which the drift-on-balls 58a and 58b are respectively mounted. The balls 58a and 58b serve to prevent a malfunction of the clutch caused by centrifugal force.

The output gear 62 of the third axle 56 meshes with the ring gear 65 of the differential gear 64 to achieve secondary speed reduction.

The rotating number of each of the first and second axles 47 and 50 are electronically controlled by a speed sensor, and the output of the differential gear shaft is also electronically controlled by the speed sensor.

The operation of the continuously variable automatic transmission with the torque converter as described above will be described hereinafter.

Power generated from the engine operates the oil put 45 through the torque converter 43 with the lockup damper 42. Since the output shaft 46 of the torque converter 43 is connected to the first axle 47 in the spline manner, the power transmitted to the first axle 47 is transmitted to the second axle 50 through the V-belt 49 connecting the first pulley 48 of the first axle 47 to the second pulley 51 of the second axle 50, thereby rotating the second axle 50.

At this point, since at the rear face of the second pulley 51 of the second axle 50, the forward wet multi-plate clutch 53a and a separate plate 68 are spline-coupled with the clutch hub 60a integrally connected to the forward gear 54a, the separate plate 68 is designed to connect or disconnect power while it is freely moved along the drum 57a in the spline manner by the clutch piston 59a. Accordingly, power transmitted to the second axle is further transmitted to the third axle 56 through the forward gear 54b meshing with the forward gear 54a of the second axle 50, and then to the differential gear 64 through the output gear 62 of the third axle, thereby consequently being transmitted to a drive axle for rotating drive wheels.

When the reverse gear 55a of the second axle 50 is operated, the wet multi-plate clutch 53b is operated in the same manner as that of the multi-plate clutch 53a when the forward gear 55a is operated.

Now, the power transmission procedure operation at each shift range will be described more in detail hereinafter.

Drive "D" Range

When a driver shifts a shift selector lever from the neutral "N" range to the drive "D" range, the piston 59a moves forwards by hydraulic pressure in accordance with the operation of a manual valve, thereby applying the forward wet multi-plate clutch 53a. Accordingly, power generated from the engine and transmitted to the V-belt 49 of the first axle 47 is fed to the forward gear 54a through the forward wet multi-plate clutch 53a and hub 60a. Next, power is transmitted to the forward gear 54b of the third axle 56 through the forward gear 54a, to the ring gear 65 meshing with the output gear 62 of the third axle 56, and finally to the drive axle 69, thereby accomplishing the forward drive.

Power is transmitted through the following procedure and drives the vehicle:

Engine 4—Output Shaft 46 of Torque Converter 43—First Axle 47—First Pulley 48—V-Belt 49—Second Pulley 51—Second Axle 50—Forward Gear 54a—Forward Gear 54b of Third Axle 56—Output Gear 62 of Third Axle 56—Differential Gear 64—Drive Axle 69

When low hydraulic pressure is applied to the first pulley 48, a gap between the moving and fixing sheaves 48b and 48a of the first pulley 48 is widened, such that the length of the longitudinal axis of the V-belt 49 is reduced. At this point, contrary to the first pulley 48, when the second pulley 51 is applied with high hydraulic pressure, a gap between the moving and fixing sheaves 51b and 51a of the second pulley 51 such that the radius of the V-belt 49 is increased. By this operation, the vehicle comes to run at a low speed ratio.

In addition, as the speed of the vehicle is gradually increased, high hydraulic pressure controlled by a transmission control unit is applied to the first pulley 48 to thereby reduce the gap between fixing and moving sheaves 48a and 48b of the first pulley 48. However, the second pulley 51, on which low hydraulic pressure is applied, decreases the gap between the fixing and moving sheaves 51a and 51b, thereby driving the vehicle at a high speed.

Lockup "L" Range

When the shift lever is shifted to the lockup "L" range, the shift operation is achieved in accordance with a shift diagram to allow the powerful operation of an engine brake. The lockup "L" range is used when the vehicle is driven on a steep incline.

Parking "p" Range

In the parking "p" range, since a parking gear 63 is locked by a parking pawl, the output shaft and the drive wheels are fixed.

Reverse "R" Range

When the shift selector lever is shifted to the reverse "R" range, the piston 49b acts on the reverse wet multi-plate clutch 53b to transmit power thereto. Accordingly, power generated from the engine and transmitted to the V-belt of the first axle 47 is transmitted to the reverse gear 55b through the reverse wet multi-plate clutch 53b of the second axle 50 and the hub 60b.

The power transmitted to the reverse gear 55b changes its rotating direction by an idle gear and is then transmitted to the drive axle, thereby achieving the reverse drive of the vehicle.

That is, power is transmitted through the following procedure to achieve the reverse drive of the vehicle:

Engine 4—Output Shaft 46 of Torque Converter 43—First Axle 47—First Pulley 48—V-Belt 49—Second Pulley 51—Second Axle 50—Reverse gear 55—Idle Gear 54b —Reverse Gear 55b of Third Axle 56—Output Gear 62 of Third Axle 56—Differential Gear 64—Drive Axle 69

Neutral "N" Range

When the shift selector lever is shifted to the neutral "IN" range, the forward and reverse wet multi-plate clutches 53a and 53b of the second axle 50 are not applied. Accordingly, power, which is generated from the engine 4 and transmitted to the second pulley 51 of the second axle 50, leaves the second axle 50 in an idle state such that power cannot be transmitted to the third axle 56, thereby maintaining the vehicle in the neutral state.

As described above, since the continuously variable automatic transmission according to the present invention uses the torque converter, drive force can be increased twice, thereby increasing the accelerating ability as well as mounting ability.

In addition, since there is no need of slip control of the wet multi-plate clutch by the use of the torque converter, the life of the wet multi-plate clutch can be prolonged, and when the brake is operated when the vehicle is running, decreasing the torque of the engine, the engine is not stopped by the slip of the torque converter such that there is no need of slip control for preventing the engine from stopping.

Particularly, since there is no shift gear, there is no shift shock during the shift operation.

In addition, since many friction members, such as the wet clutches, brakes and one-way clutches can be omitted, pistons and hydraulic valves for controlling the friction members can be also omitted, simplifying the structure of the transmission.

Now, a hydraulic control system for controlling the continuously variable automatic transmission with the torque converter will be described hereinafter with reference to FIG. 6.

Figure 6:
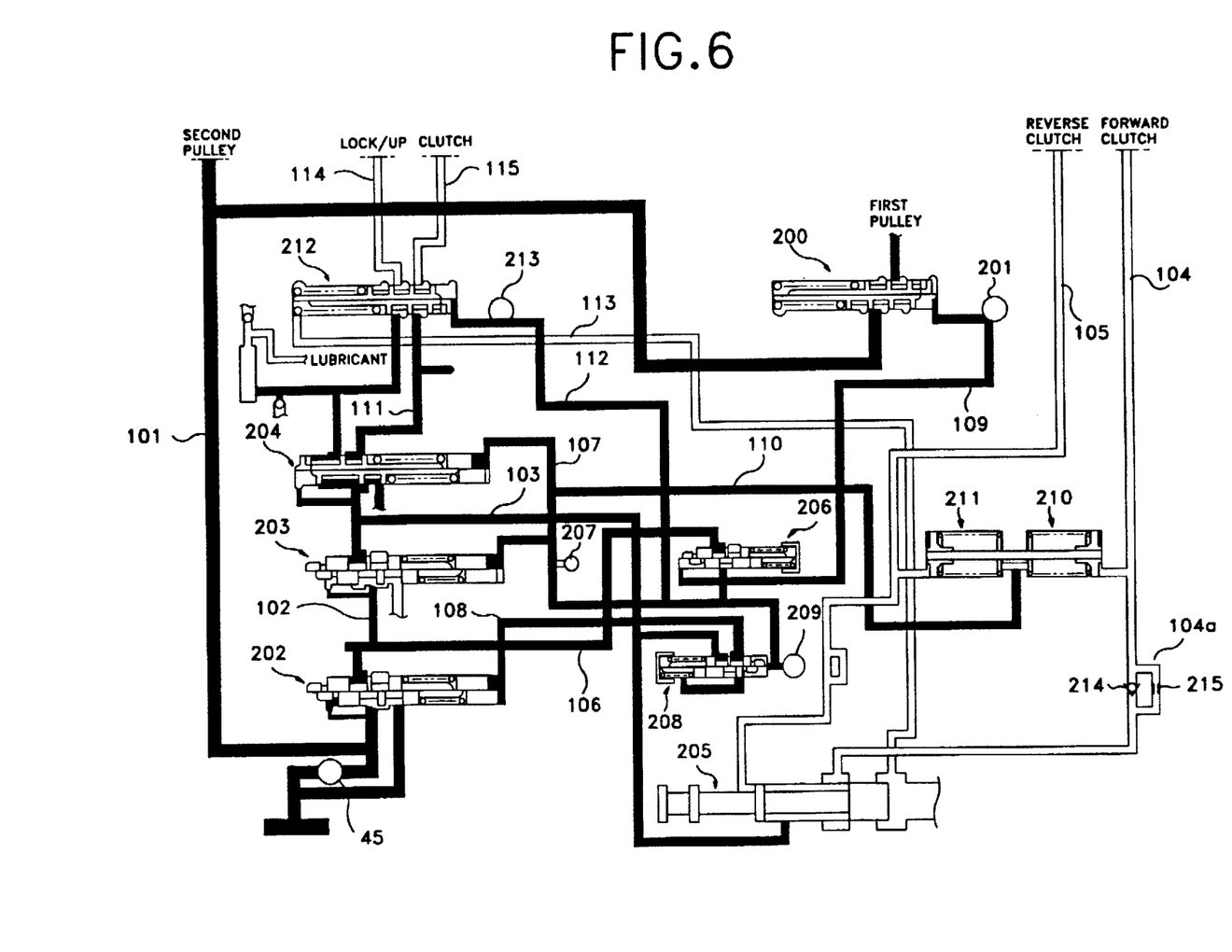
FIG. 6 is a circuit diagram illustrating the location of hydraulic pressure when a hydraulic control system, for controlling a continuously variable automatic transmission with a torque converter in accordance with a preferred embodiment of the present invention, is in a parking "p" range.

As shown in FIG. 6, a first fluid line 101 connects the hydraulic pump 45 to each piston of the first and second pulley. A ratio control valve 200 selectively feeds hydraulic pressure to vary the length of the V-belt, thereby automatically accomplishing the shift operation. A first duty solenoid valve 201 controls the opening of the ratio control valve 200 in accordance with a duty value calculated by the transmission control unit in response to the speed of the vehicle. The mounting position of the first duty solenoid valve 201 will be described hereinbelow.

A second fluid line 102 branched off from the first fluid line 101 is connected to the wet multi-plate clutch and further to the torque converter. On the second fluid line 102, a line pressure regulator valve for regulating hydraulic pressure within the second fluid line 102 and a clutch control valve 203 for controlling hydraulic pressure fed to the wet multi-plate clutch are mounted. In addition, a converter clutch valve 204 for regulating hydraulic pressure fed to the torque converter is also mounted on the second fluid line 102.

A third fluid line 103 branched off from the second fluid line 102 between the clutch control valve 203 and the converter control valve 204 is connected to the manual valve 205 which co-operates with the shift selector lever. A second duty solenoid valve 207 is provided for controlling the opening of the clutch control valve 203.

A fourth fluid line 104 extending from the manual valve 205 is connected to the piston for operating the forward wet multi-plated clutch, and a fifth fluid line 105 is connected to the piston for operating the reverse wet multi-plate clutch. A check ball valve 214 is mounted on the fourth fluid line 104 for preventing hydraulic pressure from flowing towards the forward clutch. A bypass line 104a is formed on the fourth fluid line 104 so as to bypass the check ball 214, and an orifice is formed on the bypass line 104a to retard the flow speed of hydraulic pressure.

A reducing valve 206 for reducing hydraulic pressure fed from a line pressure control valve 202 to the clutch control valve 203 is connected by a sixth fluid line 106 to the second fluid line 102 between the line pressure control valve 202 and the clutch control valve 203.

A first direction of a seventh fluid line 107 extending from the reducing valve 206 is connected to the clutch control valve 203 and the torque converter control valve 204 in a line. The second duty solenoid valve 207 is mounted on the seventh fluid line 107.

In addition, a pressure compensating valve 208 for using hydraulic pressure which is primarily reduced by the reducing valve 206 is mounted on a second direction of the seventh fluid line 107. Furthermore, a third duty solenoid valve 209 is mounted on the middle of the second direction of the seventh fluid line 107. An eighth fluid line 108 is connected between the pressure compensating valve 208 and the line pressure control valve 202 to prevent the line pressure control valve 202 from excessively opening.

A ninth fluid line 109 extending from the reducing valve 206 is connected to the ratio valve 200. The first duty solenoid valve 201 is mounted on the ninth fluid line 109. A forward accumulator 210 is located on the fourth fluid line 104 to smoothly feed hydraulic pressure to the piston of the wet multi-plate clutch through the fourth fluid line 104, thereby alleviating shift shock occurring when the shift selector lever is shifted from the neutral "N" range to the drive "D" range. A reverse accumulator 211 is located on the fifth fluid line 105 to alleviate shift shock occurring when the shift selector lever is shifted from the drive "D" range to the neutral "N" range. The accumulators 210 and 211 are disposed such that their rear ends are opposite to each other.

In addition, a tenth fluid line 110 branched off from the seventh fluid line 107 is connected to both the accumulators 210 and 211 to feed additional pressure thereto, thereby preventing shift shock caused by a rapid operation of the accumulators 210 and 211 as well as improper supply of hydraulic pressure to each piston of the forward and reverse wet multi-plate clutches.

A lockup clutch valve 212, for selectively feeding hydraulic pressure to the lockup damper which directly connects the engine to the torque converter to improve the fuel consumption ratio when the vehicle is running at high speeds, is connected to the torque converter control valve 204 through an eleventh fluid line. An On/Off solenoid valve for controlling the operation of the lockup clutch valve 212 is mounted on the twelfth fluid line 112 which is branched off from the seventh fluid line 107 and is then connected to the lockup clutch valve 212. A thirteenth fluid line 113 connects the manual valve 205 to the lockup clutch valve 212. The thirteenth fluid line 113 is a hydraulic pressure shift line which closes the lockup clutch valve regardless of the operation of the On/Off solenoid valve 213 when the shift selector lever is shifted to the lockup "L" range while the vehicle is running on a steep road.

The lockup clutch valve 212 is connected to both a lockup pressure supply line 114, through which hydraulic pressure is fed to the lockup clutch damper, and a release line, through which hydraulic pressure is released from the lockup clutch damper.

A check valve 214 is located on a line connecting the converter control valve 204 to the torque converter to prevent the excessive increase of hydraulic pressure fed from the converter control valve 204 to the torque converter.

Now, the operation of the above-described hydraulic control system at each range will be described hereinafter with reference to FIGS. 6 through 10.

In the present invention, since the forward and reverse wet multi-plate clutches are disposed on the rear side of the second pulley, hydraulic pressure is fed to the first and second pulley at all ranges. That is, hydraulic pressure generated from the hydraulic pump 45 is fed to both the first and second pulley through the first fluid line 101 such that the first and second axles can rotate by the power transmission through the V-belt.

Hydraulic pressure is further fed to the clutch control valve 203 through the line pressure control valve 202 along the second fluid line. The hydraulic pressure fed to the clutch control valve 203 is primarily controlled, and is then fed to the converter control valve 204 to be secondarily controlled. This hydraulic pressure is finally fed to the torque converter, thereby operating the torque converter. On the other hand, hydraulic pressure flowing along the third fluid line 103 is fed to the manual valve 205.

At this point, since hydraulic pressure passing through the line pressure control valve 202 is the same as the pressure of the hydraulic pump 45, this hydraulic pressure is bypassed to the reducing valve 206 through the sixth fluid line 106, thereby being reduced.

However, hydraulic pressure flowing along the third fluid line 103 is fed to the pressure compensating valve 208 and is then fed to the line pressure control valve 202 through the eighth fluid line 108. At this state, since the hydraulic pressure fed to the line pressure control valve 202 can no longer reverse, the excessive reduction of hydraulic pressure by the reducing valve 206 can be prevented.

The third duty solenoid valve 209 mounted on the seventh fluid line 107 regulates the reduced hydraulic pressure in accordance with a duty value which is pre-set at the transmission control unit.

The reduced hydraulic pressure is fed to both the clutch control valve 203 and the torque converter control valve 204 through the seventh fluid line 107. During this operation, the hydraulic pressure is controlled by the second duty solenoid valve which is duty-controlled by the transmission control unit. Further, the reduced hydraulic pressure is fed to the ratio valve 200 through the ninth fluid valve 109 to control the opening of the ratio valve 200. When this happens, the reduced hydraulic pressure is also controlled by the first duty solenoid valve 201.

In addition, hydraulic pressure fed to the lockup clutch valve 212 through the converter control valve 204 cannot be fed to the lockup pressure supply line 114 since the lockup clutch valve 212 is closed by the Off operation of the solenoid valve 213.

The flow of hydraulic pressure at all ranges is as described above, and the flow of hydraulic pressure at each range will be described more in detail hereinafter.

Drive "D" Range

Figure 7:
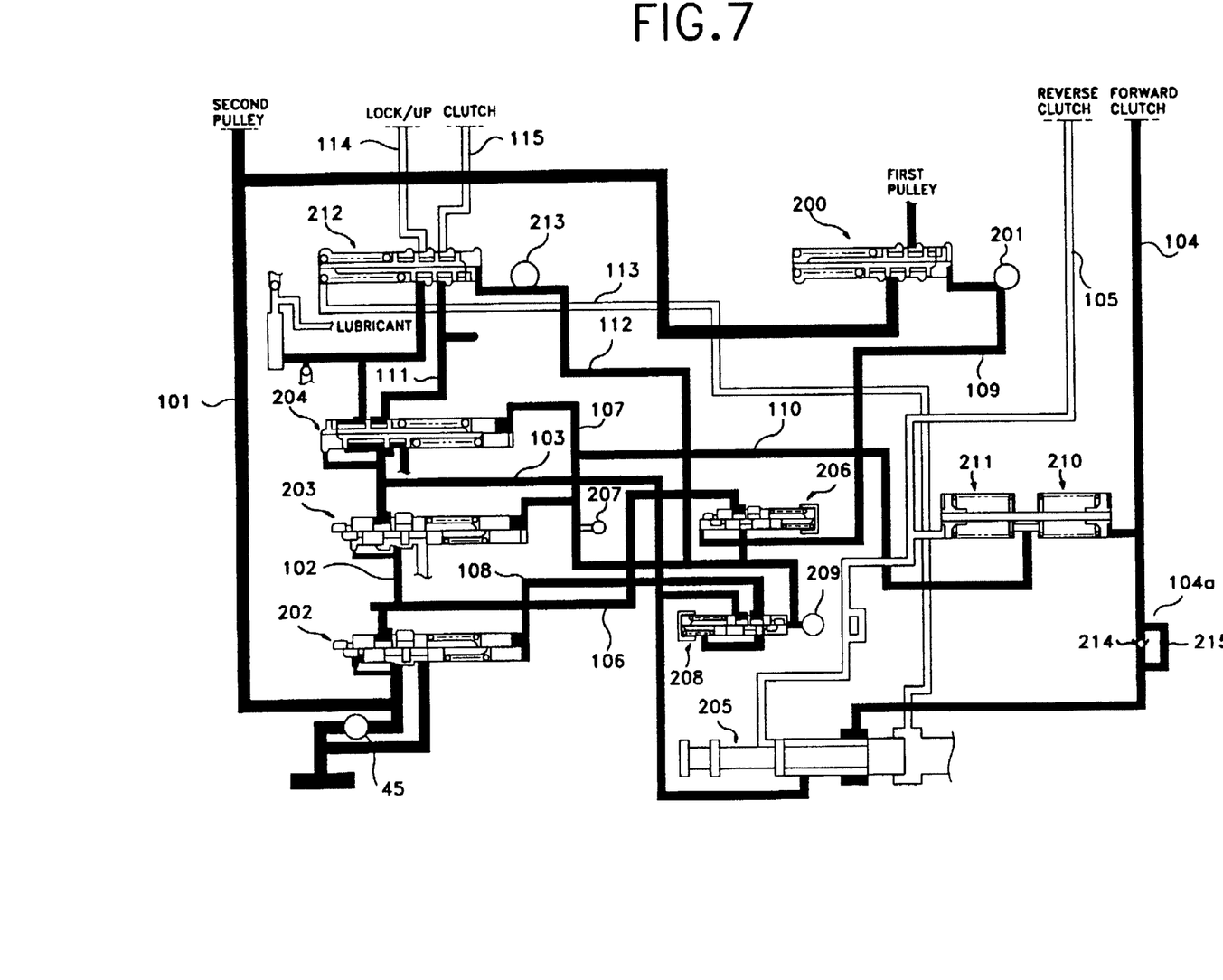
FIG. 7 is a circuit diagram illustrating the location of hydraulic pressure when a hydraulic control system, for controlling a continuously variable automatic transmission with a torque converter in accordance with a preferred embodiment of the present invention, is in a drive "D" range.

FIG. 7 shows a circuit diagram illustrating the location of hydraulic pressure when the hydraulic control system is in a drive "D" range.

Hydraulic pressure generated from the hydraulic pump 45 is fed to both the first and second pulleys through the first fluid line 101. At this point, when signals regarding the opening of the throttle valve, vehicle speed, engine RPMs, and drive "D" range is inputted to the transmission control unit, and the transmission control unit determines that a low speed gear ratio is required, a duty value of the first duty solenoid valve 201 is lowered. Accordingly, since the opening of the ratio control valve 200 is reduced, thereby reducing the amount of hydraulic pressure fed to the first pulley, pressure applied to the piston of the first pulley is lowered.

As a result, the gap between the fixing and moving sheaves of the first pulley is widened, such that the contact area between the V-belt and the first pulley is reduced. On the other hand, when the amount of hydraulic pressure fed to the second pulley is increased, the gap of the second pulley is reduced, such that the contact area between the V-belt and the second pulley is increased, thereby accomplishing the low speed gear ratio.

At this state, when the speed of the vehicle is gradually increased, line pressure for controlling torque required for driving the vehicle with high speeds is formed on the line pressure control valve 202 by the above-described operation, and is then regulated at the clutch control valve 203 to properly control the clutch. This regulation is also achieved by the second and third duty solenoid valves 207 and 209. The second duty solenoid valve 207 also regulates the converter control valve 204 to feed appropriate hydraulic pressure to the torque converter.

On the one hand, since the ratio valve 200 is controlled by the first duty solenoid valve 201 having a high duty value, the opening of the ratio valve 200 is increased. Therefore, since the first pulley is applied with a high pressure, the gap between the fixing and moving sheaves of the first pulley is widened. To the contrary, since the second pulley is applied with a low pressure, the gap between the fixing and moving sheaves of the second pulley is shortened, thereby increasing the contacting area of the V-belt and accomplishing the high speed gear ratio.

At this point, the manual valve 205 connected to the shift select lever is displaced such that the fourth fluid line 104 is opened. As a result, hydraulic pressure operates the piston of the forward wet multi-plate clutch through the fourth fluid line 104 so that the forward gear can be applied to transmit power. At this point, hydraulic pressure cannot be directly fed to the forward clutch through the fourth fluid line 104 by the check ball valve 214, but fed to the forward clutch through the bypass line 104a. Therefore, speed of the fluid is retarded while passing through the orifice 215 of the bypass line 104a, thereby preventing an abrupt shift operation.

In addition, hydraulic pressure passing through the fourth fluid line 104 is smoothly fed to the forward wet multi-plate clutch while being partly absorbed by the forward accumulator 210, thereby preventing shift shock.

Even when the amount of the hydraulic pressure absorbed by accumulator 210 is varied in accordance with the operation of the accelerating pedal, it can be compensated by properly varying exhaust pressure of the accumulator 210 through the tenth fluid line 110.

During this forwarding operating, when the vehicle is running at high speeds, the solenoid valve 213 is controlled to an ON state so that the lockup clutch valve 212 is absolutely opened. Therefore, hydraulic pressure applies the lockup damper through the pressure supply line 114 to allow the torque converter to be directly connected to the engine, thereby improving the fuel consumption ratio during high speed operation.

Reverse "R" Range

Figure 8:
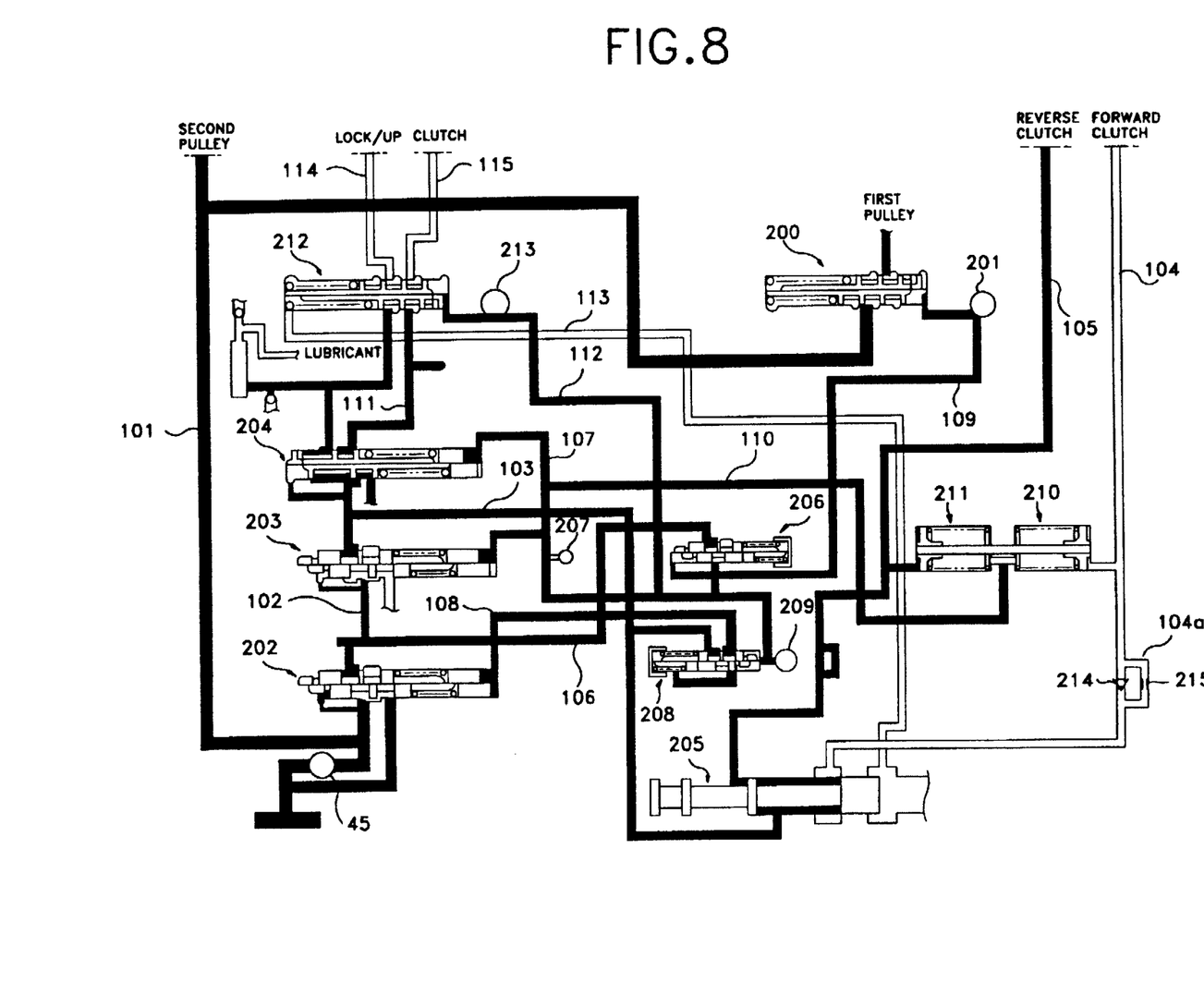
FIG. 8 is a circuit diagram illustrating the location of hydraulic pressure when a hydraulic control system, for controlling a continuously variable automatic transmission with a torque converter in accordance with a preferred embodiment of the present invention, is in a reverse "R" range.

FIG. 8 is a circuit diagram illustrating the location of hydraulic pressure when the hydraulic control system is in a reverse "R" range.

When the shift selector lever is shifted from the parking "p" range to the reverse "R" range, the manual valve 205 is displaced such that the fifth fluid line 105 is opened. Therefore, hydraulic pressure fed to the manual valve 205 through the second fluid line 102 is fed to the piston of the reverse wet multi-plate clutch. As a result, power is transmitted through the reverse gear and the idle gear, thereby reversing power.

During this operation, hydraulic pressure passing through the fifth fluid line 105 is also accumulated in the reverse accumulator 211 which performs the same function as that of the forward accumulator 210 by its exhaust pressure through the tenth fluid line 110.

Lockup "L" Range

Figure 9:
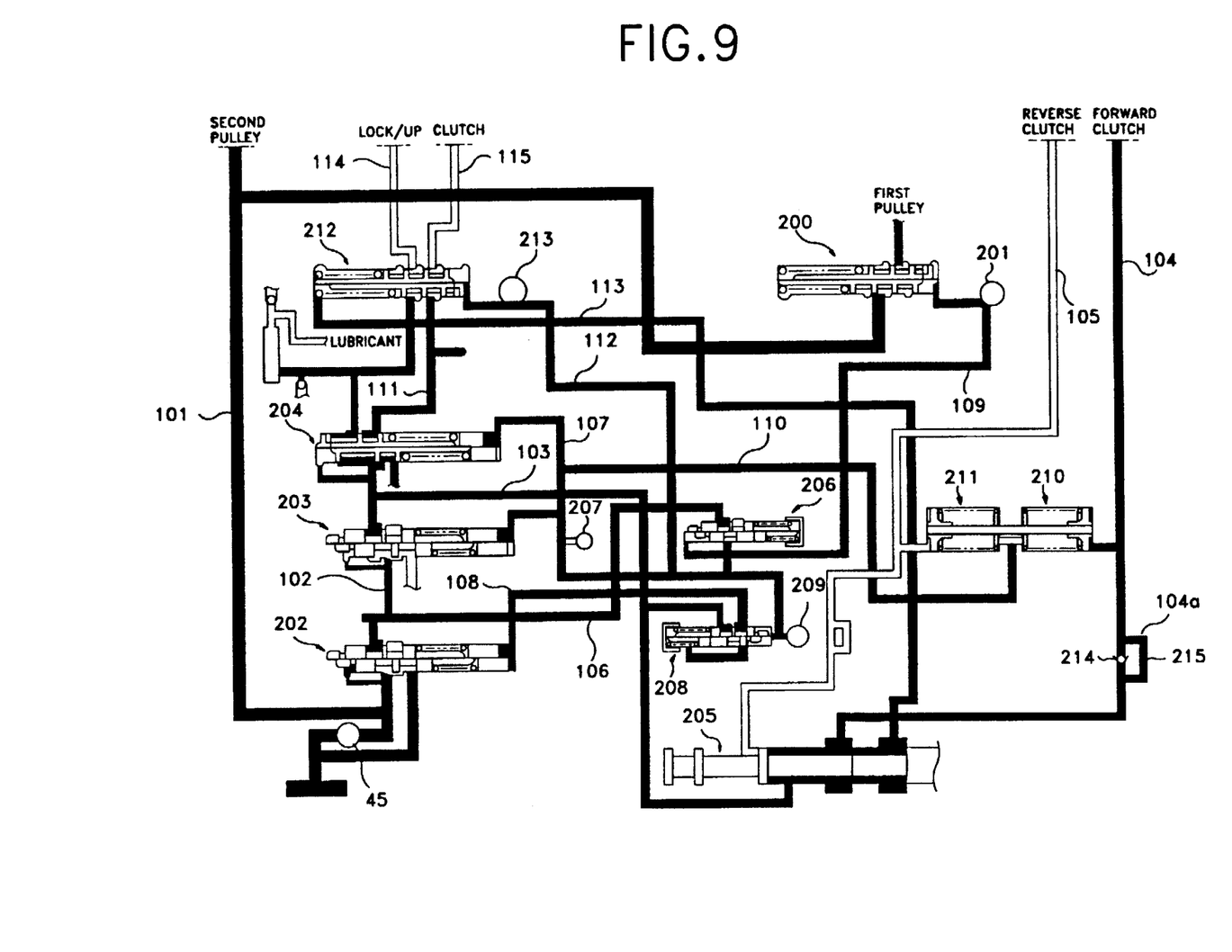
FIG. 9 is a circuit diagram illustrating the location of hydraulic pressure when a hydraulic control system, for controlling a continuously variable automatic transmission with a torque converter in accordance with a preferred embodiment of the present invention, is in a lockup "L" range.

FIG. 9 is a circuit diagram illustrating the location of hydraulic pressure when a hydraulic control system is in a lockup "L" range.

The lockup "L" range, which is used when the vehicle is being driven on a steep incline, has the almost same hydraulic pressure formation except that the thirteenth fluid line 113, as well as the fourth fluid line 104, is additionally opened by the manual valve 205. Therefore, hydraulic pressure is further fed to the lockup clutch valve 212 through the thirteenth fluid line 113 such that the pressure supply line 114 is closed regardless of the operation of the On/Off solenoid valve 213 and the release line 115 is opened. As a result, hydraulic pressure cannot be fed any more from the pressure supply line 114 and hydraulic pressure which has already been fed is released, whereby the direct connecting state of the torque converter with the engine is released.

parking "p" Range

As shown in FIG. 6, since the manual valve interrupts the fourth fluid line 104, hydraulic pressure flowing along the fifth fluid line is drained, and most of the hydraulic pressure is fed to the manual valve 205 through the second fluid line 102 but cannot be fed to the pistons of the forward and reverse wet multi-plate clutch.

Neutral "N" Range

Figure 10:
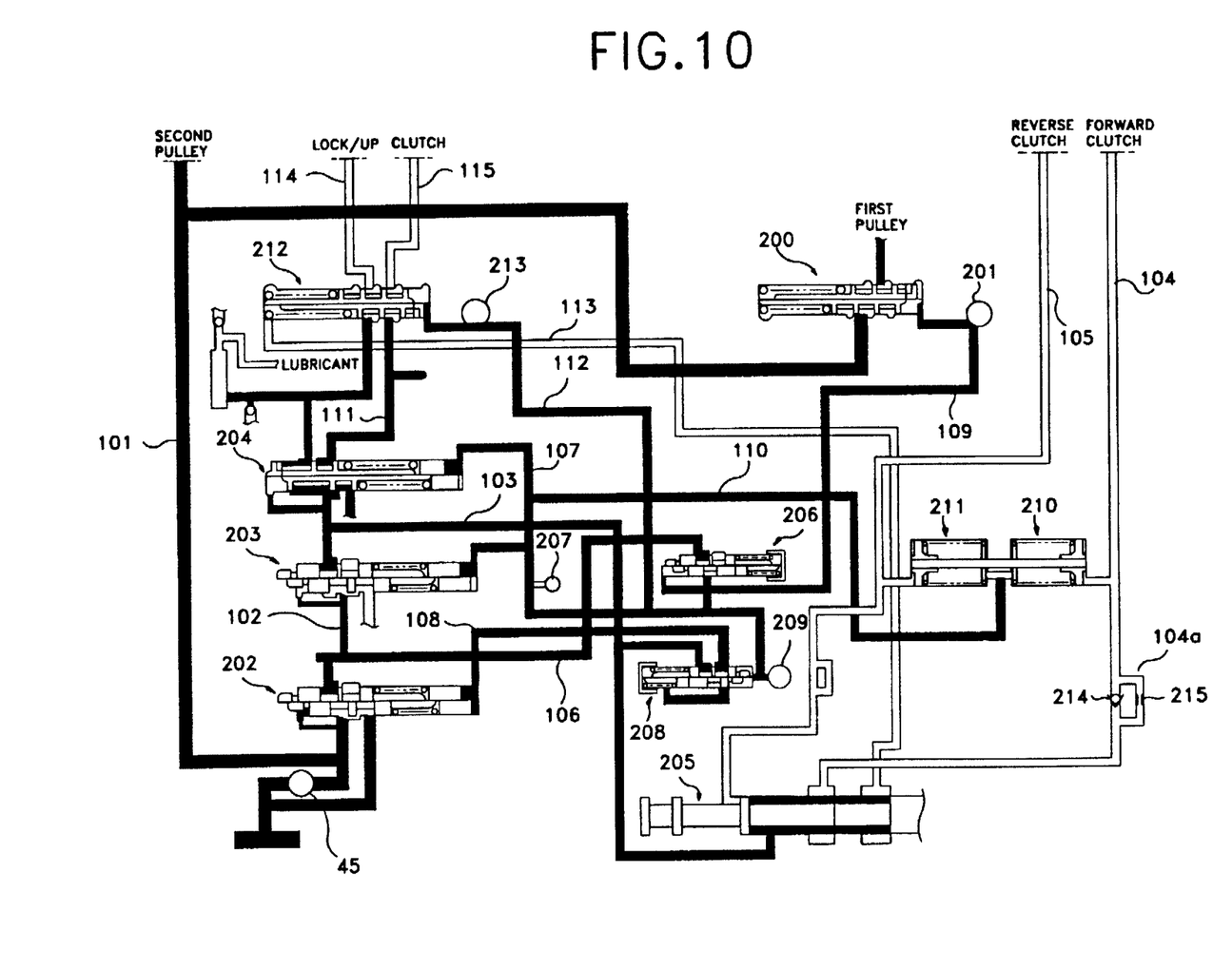
FIG. 10 is a circuit diagram illustrating the location of hydraulic pressure when a hydraulic control system, for controlling a continuously variable automatic transmission with a torque converter in accordance with a preferred embodiment of the present invention, is in a neutral "N" range.

FIG. 10 is a circuit diagram illustrating the location of hydraulic pressure when the hydraulic control system is in a neutral "N" range. The fourth, fifth and thirteenth fluid lines 104, 105 and 113 are all closed by the manual valve 205. However, since hydraulic pressure is fed inside the manual valve 205 so that, when the shift selector lever is shifted to the drive "D" range, reverse "R" range, or lockup "L" range, hydraulic pressure can be rapidly fed to through an opened fluid line.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. A continuously variable automatic transmission, comprising:

a torque converter having a lockup damper, said torque converter being connected to an engine and operating a hydraulic pump;

a first axle on which a first pulley is mounted, said first axle being connected to an output shaft of said torque converter;

a second axle on which a second pulley which is connected to the first pulley though a belt is mounted, said second axle being disposed parallel to the first axle;

a third axle on which an output gear is meshed with a ring gear of a differential system, said third axle being disposed parallel to said second axle;

a pair of pistons which are respectively mounted on rear ends of said first and second pulleys, said pistons being operated by hydraulic pressure;

forward and reverse wet multi-plate clutches which are respectively connected to the pistons to transmit power;

a pair of forward gears which are respectively mounted on said second and third axles and mesh with each other, said forward gears receiving power from the forward wet multi-plate clutch; and a pair of reverse gears which are respectively mounted on said second and third axles and mesh with each other, said reverse gears receiving power from the reverse wet multi-plate clutch, wherein a drum is integrally formed with the second pulley, said piston includes a drift-on-ball, and a hub is integrally formed with at least one of the forward gears.

2. The continuously variable automatic transmission according to claim 1, wherein the first pulley comprises fixing and moving sheaves fixed on the first axle, said moving sheaf being moved by one of said pistons, said fixing and moving sheaves being opposite to each other and opposite faces thereof being inclined, and the second pulley comprises fixing and moving sheaves fixed on the second axle, said moving sheaf being moved by the other of said pistons, said fixing and moving sheaves being opposite to each other and opposite faces thereof being inclined.

3. The continuously variable automatic transmission according to claim 1, wherein a ball bearing, at least one reverse gear, the reverse wet multi-plate clutch, and the drum are arranged adjacent to the forward gear of the second axle in said order.

4. The continuously variable automatic transmission according to claim 3, wherein the hub on which the reverse wet multi-plate clutch is mounted, is integrally formed with the reverse gear.

5. The continuously variable automatic transmission according to claim 4, wherein the piston for operating the reverse wet multi-plate clutch includes a drift-on-ball.

6. The continuously variable automatic transmission according to claim 1, wherein a parking gear is mounted between the forward gear of the third axle and the output gear, and the output gear meshes with the ring gear of a differential gear.

* * * * *